United States Patent
Bhakta et al.

(10) Patent No.: US 12,399,376 B1
(45) Date of Patent: Aug. 26, 2025

(54) WAVEGUIDE ANGLE SENSING

(71) Applicant: Apple Inc., Cupertino, CA (US)

(72) Inventors: Vikrant Bhakta, Santa Clara, CA (US); Hyungryul Choi, San Jose, CA (US); Scott M DeLapp, San Diego, CA (US); Dominic P Cincione, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/326,976

(22) Filed: May 31, 2023

Related U.S. Application Data

(60) Provisional application No. 63/354,201, filed on Jun. 21, 2022.

(51) Int. Cl.
| | |
|---|---|
| *G02B 27/01* | (2006.01) |
| *F21V 8/00* | (2006.01) |
| *G01B 11/26* | (2006.01) |
| *G06F 3/01* | (2006.01) |
| *H04N 9/31* | (2006.01) |

(52) U.S. Cl.
CPC .......... *G02B 27/0179* (2013.01); *G01B 11/26* (2013.01); *G02B 6/0016* (2013.01); *G02B 6/0038* (2013.01); *G02B 27/0172* (2013.01); *G06F 3/013* (2013.01); *H04N 9/3173* (2013.01); *G02B 2027/0187* (2013.01); *H04N 9/3102* (2013.01)

(58) Field of Classification Search
CPC ............ G02B 27/0179; G02B 27/0172; G02B 26/0016; G02B 26/0038; G02B 2027/0187; G01B 11/26; G06F 3/013; H04N 9/3173; H04N 9/3102
See application file for complete search history.

(56) References Cited

U.S. PATENT DOCUMENTS

| | | | |
|---|---|---|---|
| 11,269,406 B1* | 3/2022 | Sztuk | G06F 3/011 |
| 11,520,152 B1 | 12/2022 | Lau et al. | |
| 2014/0375681 A1* | 12/2014 | Robbins | G01B 11/272 |
| | | | 345/633 |

(Continued)

FOREIGN PATENT DOCUMENTS

WO 2022115485 A2 6/2022

OTHER PUBLICATIONS

U.S. Appl. No. 17/202,198, filed Mar. 15, 2021.
U.S. Appl. No. 17/191,183, filed Mar. 3, 2021.

*Primary Examiner* — Kenneth B Lee, Jr.
(74) *Attorney, Agent, or Firm* — Treyz Law Group, P.C.; Michael H. Lyons

(57) ABSTRACT

A head-mounted device may have a projector that emits light. The light may include visible images produced using image data and optionally infrared light. A waveguide may propagate the light and may have a first output coupler that couples the visible images out of the waveguide and towards an eye box. One or more optical sensors may generate optical sensor data based on the light emitted by the projector. Control circuitry may detect an angle between the waveguide and the projector based on the optical sensor data. The control circuitry may adjust the image data to compensate for changes in the angle over time. The optical sensors may include an optical sensor mounted to the projector and facing the waveguide and/or one or more optical sensors mounted to an optical bridge sensor.

22 Claims, 8 Drawing Sheets

(56) References Cited

U.S. PATENT DOCUMENTS

| | | | |
|---|---|---|---|
| 2019/0387168 A1* | 12/2019 | Smith | G06F 1/1686 |
| 2020/0174255 A1 | 6/2020 | Hollands et al. | |
| 2021/0302745 A1 | 9/2021 | Mutlu et al. | |
| 2023/0239455 A1* | 7/2023 | Churin | H04N 13/398 |
| | | | 348/53 |

* cited by examiner

WAVEGUIDE ANGLE SENSING

This application claims the benefit of U.S. Provisional Patent Application No. 63/354,201, filed Jun. 21, 2022, which is hereby incorporated by reference herein in its entirety.

FIELD

This relates generally to electronic devices, and, more particularly, to electronic devices such as head-mounted devices.

BACKGROUND

Electronic devices have components such as displays and other optical components. During operation, there is a risk that components may become misaligned with respect to each other due to drop events and other undesired high-stress events. This poses challenges for ensuring satisfactory component performance.

SUMMARY

A head-mounted device such as a pair of glasses may have a head-mounted housing. The head-mounted device may include displays such as projector displays and may include associated optical components. The housing may have a first portion, a second portion, and a nose bridge that couples the first portion to the second portion. A first display having a first projector and a first waveguide may be mounted in the first portion of the housing. A second display having a second projector and a second waveguide may be mounted in the second portion of the housing.

One of the projectors may emit light. The light may include visible light images that are produced by the projector based on image data. One of the waveguides may propagate the light via total internal reflection. The waveguide may have an output coupler that couples the visible light images in the light out of the waveguide and towards an eye box. If desired, the light may also include infrared light. One or more optical sensors (e.g., image sensors) may generate optical sensor data (e.g., image sensor data) based on the light emitted by the projector. Control circuitry may detect an angle between the waveguide and the projector based on the optical sensor data. The control circuitry may adjust the image data to compensate for changes in the angle over time.

The optical sensors may include an optical sensor mounted to the projector and facing the waveguide. The optical sensor may generate the optical sensor data based on a portion of the light that has reflected towards the optical sensor from the waveguide. The optical sensors may additionally or alternatively include an optical sensor in an optical bridge sensor. In these examples, the waveguide may include an additional output coupler. The additional output coupler may have a reflective diffractive mode that couples some of the light out of the waveguide and towards the optical sensor in the optical bridge sensor. The additional output coupler may also have a transmissive diffractive mode that couples some of the light out of the waveguide and towards a mirror or an additional optical sensor opposite the optical sensor. The mirror may reflect the light towards the optical sensor for generating the optical sensor data or the additional sensor may generate a portion of the optical sensor data based on the light received from the additional output coupler.

DETAILED DESCRIPTION

Figure 1:
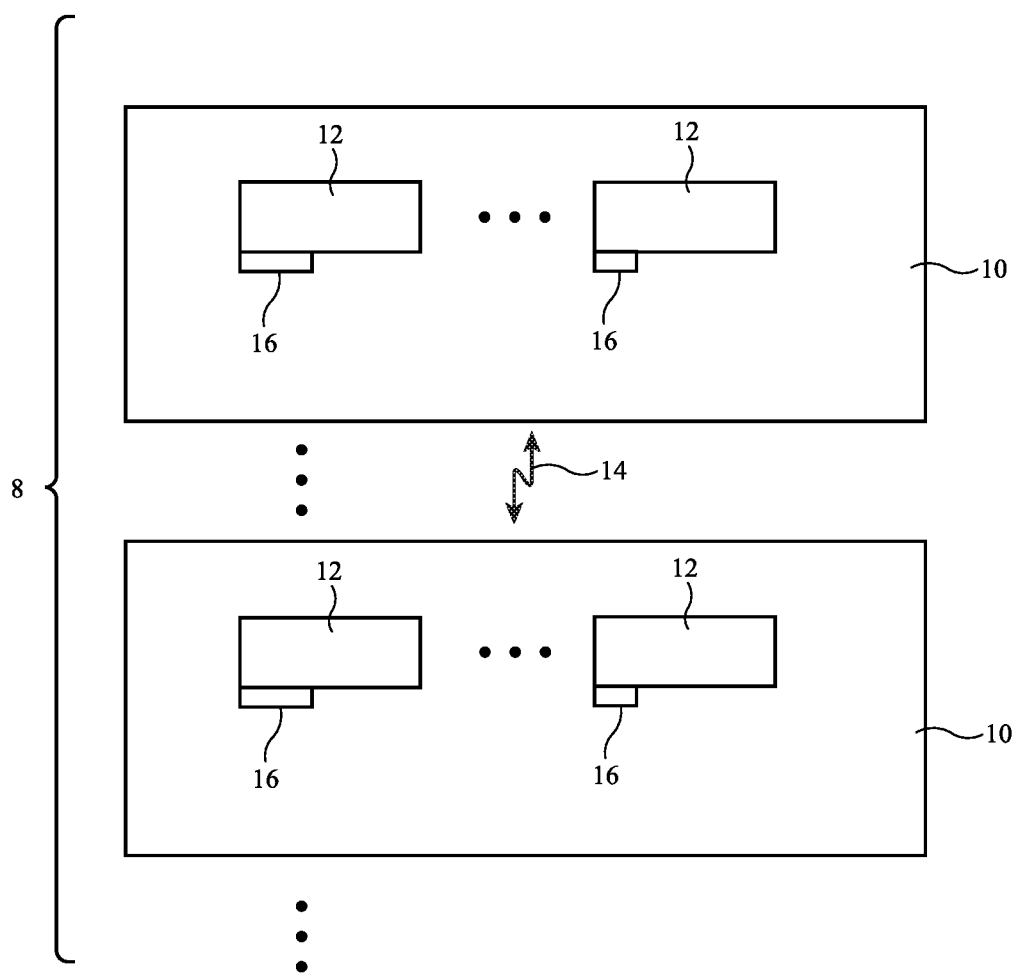
FIG. 1 is a diagram of an illustrative system in accordance with some embodiments.

A system may include one or more electronic devices. Each device may contain optical components and other components. FIG. 1 is a schematic diagram of an illustrative system of the type that may include one or more electronic devices with optical components. As shown in FIG. 1, system 8 may include electronic devices 10. Devices 10 may include head-mounted devices (e.g., goggles, glasses, helmets, and/or other head-mounted devices), cellular telephones, tablet computers, peripheral devices such as headphones, game controllers, and/or other input devices. Devices 10 may, if desired, include laptop computers, computer monitors containing embedded computers, desktop computers, media players, or other handheld or portable electronic devices, smaller devices such as wristwatch devices, pendant devices, ear buds, or other wearable or miniature devices, televisions, computer displays that do not contain embedded computers, gaming devices, remote controls, embedded systems such as systems in which equipment is mounted in a kiosk, in an automobile, airplane, or other vehicle, removable external cases for electronic equipment, straps, wrist bands or head bands, removable covers for electronic devices, cases or bags that receive and carry electronic equipment and other items, necklaces or arm bands, wallets, sleeves, pockets, or other structures into which electronic equipment or other items may be inserted, part of an item of clothing or other wearable item (e.g., a hat, belt, wrist band, headband, sock, glove, shirt, pants, etc.), or equipment that implements the functionality of two or more of these devices.

With one illustrative configuration, which may sometimes be described herein as an example, system 8 includes a head-mounted device such as a pair of glasses (sometimes referred to as augmented reality glasses). System 8 may also include peripherals such as headphones, game controllers, and/or other input-output devices (as examples). In some scenarios, system 8 may include one or more stand-alone devices 10. In other scenarios, multiple devices 10 in system 8 exchange information using wired and/or wireless links, which allows these devices 10 to be used together. For example, a first of devices 10 may gather user input or other input that is used to control a second of devices 10 (e.g., the first device may be a controller for the second device). As another example, a first of devices 10 may gather input that is used in controlling a second device 10 that, in turn, displays content on a third device 10.

Devices 10 may include components 12. Components 12 may include control circuitry. The control circuitry may include storage and processing circuitry for supporting the operation of system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in the control circuitry may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between devices 10 and/or to support communications between equipment in system 8 and external electronic equipment, devices 10 may include wired and/or wireless communications circuitry. The communications circuitry of devices 10, which may sometimes be referred to as control circuitry and/or control and communications circuitry, may include antennas, radio-frequency transceiver circuitry, and other wireless communications circuitry and/or wired communications circuitry. The communications circuitry of devices 10 may, for example, support bidirectional wireless communications between devices 10 over wireless links such as wireless link 14 (e.g., a wireless local area network link, a near-field communications link, or other suitable wired or wireless communications link (e.g., a Bluetooth® link, a WiFi® link, a 60 GHz link or other millimeter wave link, etc.). Components 12 may also include power circuits for transmitting and/or receiving wired and/or wireless power and may include batteries.

Components 12 may include input-output devices. The input-output devices may be used in gathering user input, in gathering information on the environment surrounding the user, and/or in providing a user with output. The input-output devices may include sensors such as force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors, and/or other touch sensors and/or proximity sensors, monochromatic and color ambient light sensors, optical sensor (e.g., image sensors), sensors for detecting position, orientation, and/or motion (e.g., accelerometers, magnetic sensors such as compass sensors, gyroscopes, and/or inertial measurement units that contain some or all of these sensors), radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, and/or other sensors. In some arrangements, devices 10 may use sensors and/or other input-output devices to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.).

Components 12 may include haptic output devices. The haptic output devices can produce motion that is sensed by the user (e.g., through the user's head, hands, or other body parts). Haptic output devices may include actuators such as electromagnetic actuators, motors, piezoelectric actuators, electroactive polymer actuators, vibrators, linear actuators, rotational actuators, actuators that bend bendable members, etc.

If desired, input-output devices in components 12 may include other devices such as displays (e.g., to display images for a user), status indicator lights (e.g., a light-emitting diode that serves as a power indicator, and other light-based output devices), speakers and other audio output devices, electromagnets, permanent magnets, structures formed from magnetic material (e.g., iron bars or other ferromagnetic members that are attracted to magnets such as electromagnets and/or permanent magnets), etc.

As shown in FIG. 1, sensors such as position sensors 16 may be mounted to one or more of components 12. Position sensors 16 may include optical sensors (e.g., visible or infrared optical sensors), accelerometers, magnetic sensors such as compass sensors, gyroscopes, and/or inertial measurement units (IMUs) that contain some or all of these sensors. Position sensors 16 may be used to measure location (e.g., location along X, Y, and Z axes), orientation (e.g., angular orientation around the X, Y, and Z axes), and/or motion (changes in location and/or orientation as a function of time). Sensors such as position sensors 16 that can measure location, orientation, and/or motion may sometimes be referred to herein as position sensors, motion sensors, and/or orientation sensors.

Devices 10 may use position sensors 16 to monitor the position (e.g., location, orientation, motion, etc.) of devices 10 in real time. This information may be used in controlling one or more devices 10 in system 8. As an example, a user may use a first of devices 10 as a controller. By changing the position of the first device, the user may control a second of devices 10 (or a third of devices 10 that operates in conjunction with a second of devices 10). As an example, a first device may be used as a game controller that supplies user commands to a second device that is displaying an interactive game.

Devices 10 may also use position sensors 16 to detect any changes in position of components 12 with respect to the housings and other structures of devices 10 and/or with respect to each other. For example, a given one of devices 10 may use a first position sensor 16 to measure the position of a first of components 12, may use a second position sensor 16 to measure the position of a second of components 12, and may use a third position sensor 16 to measure the position of a third of components 12. By comparing the measured positions of the first, second, and third components (and/or by using additional sensor data), device 10 can determine whether calibration operations should be performed, how calibration operations should be performed, and/or when/how other operations in device 10 should be performed.

Figure 2:
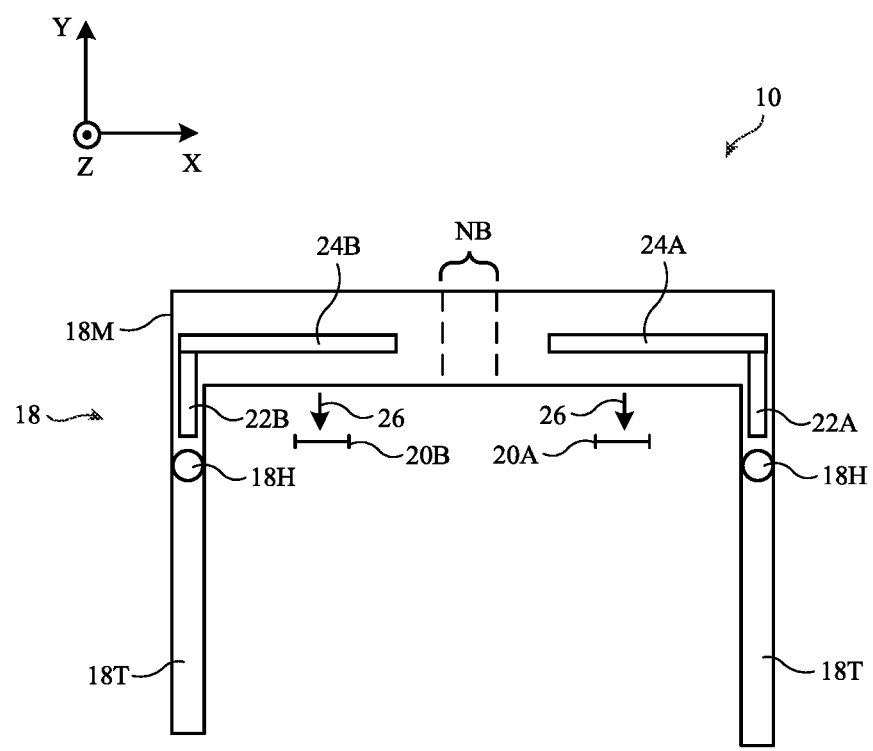
FIG. 2 is a top view of an illustrative head-mounted device in accordance with some embodiments.

In an illustrative configuration, devices 10 include a head-mounted device such as a pair of glasses (sometimes referred to as augmented reality glasses). A top view of device 10 in an illustrative configuration in which device 10 is a pair of glasses is shown in FIG. 2. A shown in FIG. 2, device 10 may include housing 18. Housing 18 may include a main portion (sometimes referred to as a glasses frame) such as main portion 18M and temples 18T that are coupled to main portion 18M by hinges 18H. Nose bridge portion NB may have a recess that allows housing 18 to rest on a nose of a user while temples 18T rest on the user's ears.

Images may be displayed in eye boxes 20 using displays 22 and waveguides 24. Displays 22 may sometimes be referred to herein as projectors 22, projector displays 22, display projectors 22, light projectors 22, image projectors 22, light engines 22, or display modules 22. Projector 22 may include a first projector 22B (sometimes referred to herein as left projector 22B) and a second projector 22A (sometimes referred to herein as right projector 22A). Projectors 22A and 22B may be mounted at opposing right and left edges of main portion 18M of housing 18, for example. Eye boxes 20 may include a first eye box 20B (sometimes referred to herein as left eye box 20B) and may include a second eye box 20A (sometimes referred to herein as right eye box 20A). Waveguides 24 may include a first waveguide 24B (sometimes referred to herein as left waveguide 24B) and a second waveguide 24A (sometimes referred to herein as right waveguide 24A). Main portion 18M of housing 18 may, for example, have a first portion that includes projector 22B and waveguide 24B and a second portion that includes projector 22A and waveguide 24A (e.g., where nose bridge NB separates the first and second portions such that the first portion is at a first side of the nose bridge and the second portion is at a second side of the nose bridge).

Waveguides 24 may each include one or more stacked substrates (e.g., stacked planar and/or curved layers sometimes referred to herein as waveguide substrates) of optically transparent material such as plastic, polymer, glass, etc. If desired, waveguides 24 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguides 24 may include holographic phase gratings such as volume holograms or thin-film holograms, meta-gratings, or any other desired diffractive grating structures. The diffractive gratings on waveguides 24 may also include surface relief gratings (SRGs) formed on one or more surfaces of the substrates in waveguides 24, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles).

Waveguides 24 may have input couplers that receive light from projectors 22. This image light is then guided laterally (along the X axis) within waveguides 24 in accordance with the principal of total internal reflection. Each waveguide 24 may have an output coupler in front of a respective eye box 20. The output coupler couples the image light out of the waveguide 24 and directs an image towards the associated eye box 20 for viewing by a user (e.g., a user whose eyes are located in eye boxes 20), as shown by arrows 26. Input and output couplers for device 10 may be formed from diffractive gratings (e.g., surface relief gratings, volume holograms, etc.) and/or other optical structures.

For example, as shown in FIG. 2, projector 22B may emit (e.g., produce, generate, project, or display) image light that is coupled into waveguide 24B (e.g., by a first input coupler on waveguide 24B). The image light may propagate in the +X direction along waveguide 24B via total internal reflection. The output coupler on waveguide 24B may couple the image light out of waveguide 24B and towards eye box 20B (e.g., for view by the user's left eye at eye box 20B). Similarly, projector 22A may emit (e.g., produce, generate, project, or display) image light that is coupled into waveguide 24A (e.g., by a second input coupler on waveguide 24A). The image light may propagate in the −X direction along waveguide 24A via total internal reflection. The output coupler on waveguide 24A may couple the image light out of waveguide 24A and towards eye box 20A (e.g., for view by the viewer's right eye at eye box 20A).

Figure 3:
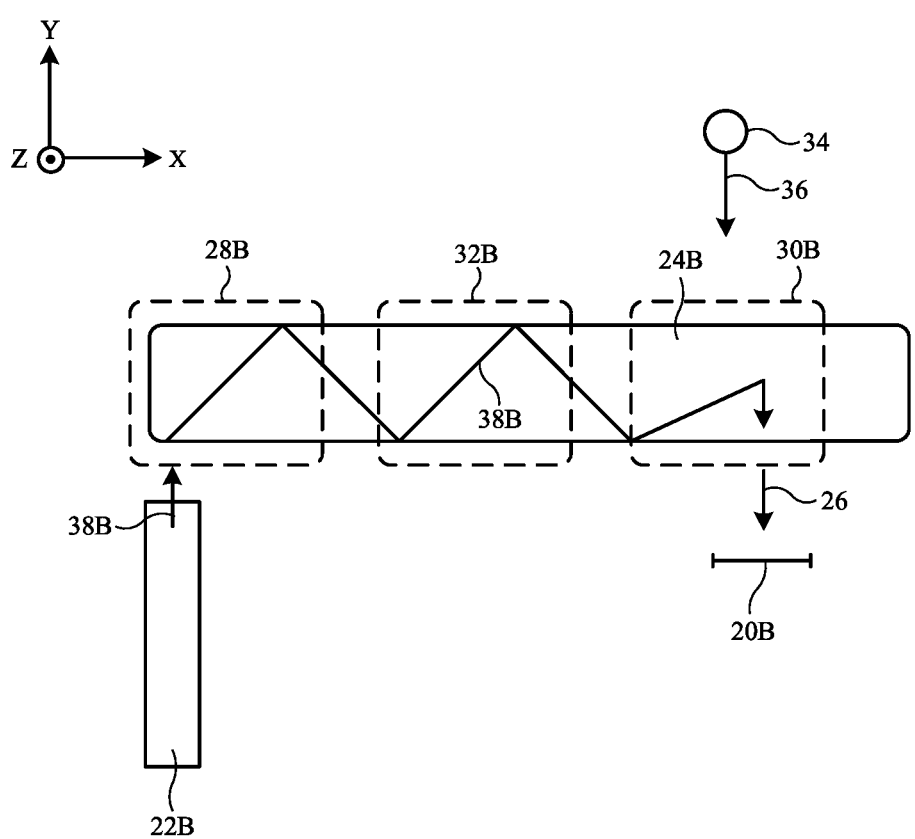
FIG. 3 is a top view of an illustrative display projector and waveguide for providing image light to an eye box in accordance with some embodiments.

FIG. 3 is a top view showing how waveguide 24B may provide light to eye box 20B. As shown in FIG. 3, projector 22B may emit image light 38B that is provided to waveguide 24B. Projector 22B may include collimating optics (sometimes referred to as an eyepiece, eyepiece lens, or collimating lens) that help direct image light 38B towards waveguide 24B. Projector 22B may generate image light 38B associated with image content to be displayed to (at) eye box 20B. Projector 22B may include light sources that produce image light 38B (e.g., in scenarios where projector 22B is an emissive display module, the light sources may include arrays of light emitters such as LEDs) or may include light sources that produce illumination light that is provided to a spatial light modulator in projector 22B. The spatial light modulator may modulate the illumination light with (using) image data (e.g., a series of image frames) to produce image light 38B (e.g., image light that includes images as identified by the image data). The spatial light modulator may be a transmissive spatial light modulator (e.g., may include a transmissive display panel such as a transmissive LCD panel) or a reflective spatial light modulator (e.g., may include a reflective display panel such as a DMD display panel, an LCOS display panel, an fLCOS display panel, etc.).

Waveguide 24B may be used to present image light 38B output from projector 22B to eye box 20B. Waveguide 24B may include one or more optical couplers such as input coupler 28B, cross-coupler 32B, and output coupler 30B. In the example of FIG. 3, input coupler 28B, cross-coupler 32B, and output coupler 30B are formed at or on waveguide 24B. Input coupler 28B, cross-coupler 32B, and/or output coupler 30B may be completely embedded within the substrate layers of waveguide 24B, may be partially embedded within the substrate layers of waveguide 24B, may be mounted to waveguide 24B (e.g., mounted to an exterior surface of waveguide 24B), etc.

The example of FIG. 3 is merely illustrative. One or more of these couplers (e.g., cross-coupler 32B) may be omitted. Waveguide 24B may be replaced with multiple waveguides that are laterally and/or vertically stacked with respect to each other. Each of these waveguides may include one, two, all, or none of couplers 28B, 32B, and 30B. Waveguide 24B may be at least partially curved or bent if desired.

Waveguide 24B may guide image light 38B down its length via total internal reflection. Input coupler 28B may be configured to couple image light 38B into waveguide 24B, whereas output coupler 30B may be configured to couple image light 38B from within waveguide 24B to the exterior of waveguide 24B and towards eye box 20B. Input coupler 28B may include an input coupling prism, one or more mirrors (e.g., louvered partially reflective mirrors), or diffractive gratings such as an SRG or a set of volume holograms, as examples.

As shown in FIG. 3, projector 22B may emit image light 38B in the +Y direction towards waveguide 24B. When image light 38B strikes input coupler 28B, input coupler 28B may redirect image light 38B so that the light propagates within waveguide 24B via total internal reflection towards output coupler 30B (e.g., in the +X direction). When image light 38B strikes output coupler 30B, output coupler 30B may redirect image light 38B out of waveguide 24B towards eye box 20B (e.g., back in the −Y direction). In scenarios where cross-coupler 32B is formed at waveguide 24B, cross-coupler 32B may redirect image light 38B in one or more directions as it propagates down the length of waveguide 24B, for example. Cross-coupler 32B may expand a pupil of image light 38B if desired.

Input coupler 28B, cross-coupler 32B, and/or output coupler 30B may be based on reflective and refractive optics or may be based on holographic (e.g., diffractive) optics. In arrangements where couplers 28B, 30B, and 32B are formed from reflective and refractive optics, couplers 28B, 30B, and 32B may include one or more reflectors (e.g., an array of micromirrors, partial mirrors, louvered mirrors, or other reflectors). In arrangements where couplers 2B8, 30B, and 32B are based on holographic optics, couplers 28B, 30B, and 32B may include diffractive gratings (e.g., volume holograms, surface relief gratings, etc.). Any desired combination of holographic and reflective optics may be used to form couplers 28B, 30B, and 32B. In one suitable arrangement that is sometimes described herein as an example, input coupler 28B, cross-coupler 32B, and output coupler 30B each include surface relief gratings (e.g., surface relief gratings formed by modulating the thickness of one or more layers of surface relief grating substrate in waveguide 24B).

In an augmented reality configuration, waveguide 24B may also transmit (pass) real-world light from the scene/environment in front of (facing) device 10. The real-world light (sometimes referred to herein as world light or environmental light) may include light emitted and/or reflected by objects in the scene/environment in front of device 10. For example, output coupler 30B may transmit world light 36 from real-world objects 34 in the scene/environment in front of device 10. Output coupler 30B may, for example, diffract image light 38B to couple image light 38B out of waveguide 24B and towards eye box 20B while transmitting world light 36 (e.g., without diffracting world light 36) to eye box 20B. This may allow images in image light 38B to be overlaid with world light 36 of real-world objects 34 (e.g., to overlay virtual objects from image data in image light 38B as displayed by projector 22B with real-world objects 34 in front of the user when viewed at eye box 20A).

In the example of FIG. 3, only the waveguide and projector for providing image light to eye box 20B is shown for the sake of clarity. Waveguide 24A (FIG. 2) may include similar structures for providing light to eye box 20A. During operation of device 10 (e.g., by an end user), mechanical stresses, thermal effects, and other stressors may alter the alignment between two or more components of device 10.

For example, the optical alignment between the components of device 10 may change when the user places device 10 on their head, removes device 10 from their head, places device 10 on a surface or within a case, or drops device 10 on the ground, when a mechanical impact event occurs at device 10, when device 10 enters different environments at different temperatures or humidities, when a user bends, stresses, or shakes one or more components in device 10, etc. If care is not taken, these changes in optical alignment can undesirably affect the images provided to eye boxes 20A and/or 20B (e.g., can produce visible misalignment or distortion at one or both eye boxes 20A and 20B). As these changes in optical alignment will vary by user and from system-to-system, it may be desirable to actively identify such changes in the field (e.g., during operation of device 10 by an end user rather than in-factory during the manufacture of device 10) so that suitable action can be taken to mitigate the identified changes to provide an optimal display experience for the user over time.

Device 10 may perform in-field calibration operations to detect and optionally mitigate optical misalignment using a set of sensors. The set of one or more sensors may measure a waveguide angle between projector 22B and waveguide 24B. Changes in the waveguide angle over time may be associated with optical misalignment between the images displayed by the projector and the images as viewed at the eye box and/or may be associated with optical misalignment between the left and right eye boxes. By measuring (detecting) the waveguide angle, the set of sensors may mitigate such optical misalignment. If desired, the set of sensors that measure waveguide angle may include an optical sensor mounted to projector 22B.

Figure 4:
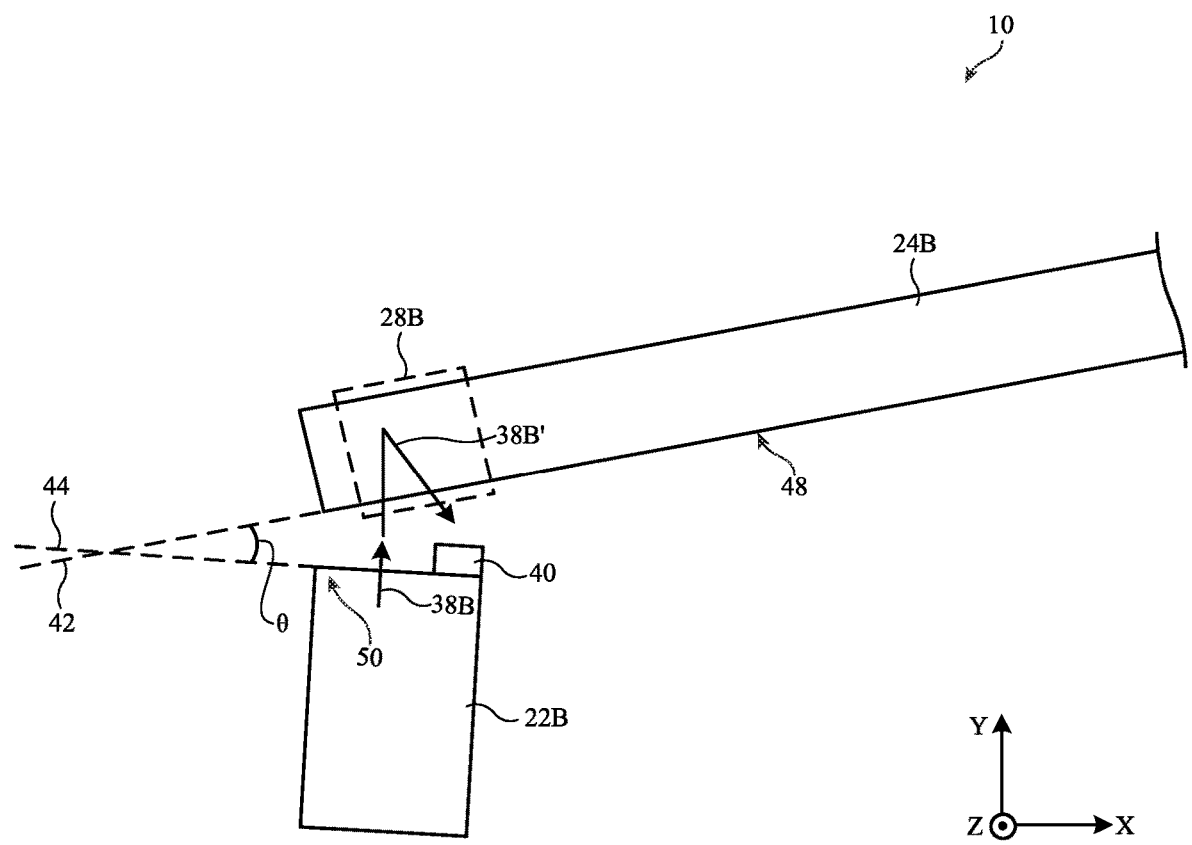
FIG. 4 is a top view of an illustrative display projector having an optical sensor for detecting a waveguide angle in accordance with some embodiments.

FIG. 4 is a top view showing how device 10 may include an optical sensor mounted to projector 22B for measuring waveguide angle. As shown in FIG. 4, projector 22B may be optically coupled to a first (left) edge of waveguide 24B (e.g., a temple side/edge of the first waveguide). Projector 22B may emit image light 38B. Input coupler 28B may couple image light 38B into waveguide 24B (e.g., within the total internal reflection (TIR) range of the waveguide). Waveguide 24B may propagate image light 38B along its length via total internal reflection. Cross-coupler 32B (FIG. 3) and output coupler 30B have been omitted from FIG. 4 for the sake of clarity.

Waveguide 24B may have a lateral surface 48 (sometimes referred to herein as a lateral waveguide surface of a simply as a waveguide surface). Lateral surface 48 may face the user or, if desired, may face world-side. Projector 22B may also have a lateral (output) surface 50 facing waveguide 24B. Lateral surface 48 may lie within plane 42. Lateral surface 50 may lie within plane 44. Plane 42 (lateral surface 48 of waveguide 24B) may be oriented at a waveguide angle θ with respect to plane 44 (lateral surface 50 of waveguide 24B). In other words, waveguide 24B may be tilted or oriented at waveguide angle θ with respect to projector 22B. Over time, waveguide angle θ may change from a nominal, ideal, or expected waveguide angle (e.g., zero degrees) due to mechanical stresses on device 10. This may cause optical misalignment in device 10.

An optical sensor such as optical sensor 40 may be mounted on or in projector 22B for measuring waveguide angle θ. Optical sensor 40 may be mounted to lateral surface 50 of projector 22B, as one example. Optical sensor 40 of FIG. 4 may be used to detect (measure) waveguide angle θ based on the image light 38B emitted by projector 22B. Optical sensor 40 may include one or more optical sensors (e.g., one or more visible light optical sensors or cameras having one or more optical sensor pixels arranged in corresponding array(s) of optical sensor pixels). One or more lenses or microlenses may be disposed overlapping the optical sensor(s). Optical sensor 40 may include a quad cell sensor as one example.

Optical sensor 40 may receive a portion 38B' of the image light 38B emitted by projector 22B. For example, some of image light 38B (i.e., portion 38B') may reflect off lateral surface 48 and/or the opposing lateral surface of waveguide 24B and towards optical sensor 40 (e.g., outside of the TIR range of the waveguide). Some of image light 38B (i.e., portion 38B') may additionally or alternatively be diffracted towards optical sensor 40 by input coupler 28B (e.g., at angles outside the TIR range of the waveguide). For example, in implementations where input coupler 28B includes a diffractive grating, input coupler 28B may reflect some portion 38B' of image light 38B towards optical sensor 40 via zero-order reflection of portion 38B' by the diffractive grating.

The portion 38B' of image light 38B received at optical sensor 40 may be used to detect waveguide angle θ. For example, optical sensor 40 may generate optical sensor data (e.g., image sensor data) based on portion 38B' of the image light 38B. Different regions of optical sensor 40 (e.g., different sensor pixels or cells) will be illuminated by portion 38B' when different waveguide angles θ are present between waveguide 24B and projector 22B. Control circuitry (e.g., one or more processors) may use the optical sensor data to identify (e.g., compute, calculate, generate, measure, detect, etc.) waveguide angle θ by, for example, comparing the regions of optical sensor 40 that are illuminated by portion 38B' (or the intensity of measured light at different sensor pixel positions) to predetermined (e.g., expected, calibrated, ideal, nominal, etc.) regions of optical sensor 40 (or expected optical sensor data) that would be measured when waveguide angle θ has a nominal value (e.g., zero degrees). Once waveguide angle θ is known, the one or more processors may mechanically adjust the optical alignment of one or more components in device 10 and/or may adjust the image data used to produce image light 38B (e.g., by pre-distorting and/or color-compensate the image light) in a manner that mitigates any optical misalignment or non-idealities produced by the detected waveguide angle θ differing from the expected or nominal waveguide angle θ.

Image light 38B and thus portion 38B' of image light 38B include visible light (e.g., for display at the eye box). The example of FIG. 4 in which optical sensor 40 detects waveguide angle θ based on portion 38B' of image light 38B is merely illustrative. If desired, optical sensor 40 may detect waveguide angle θ based on infrared light emitted by projector 22B.

Figure 5:
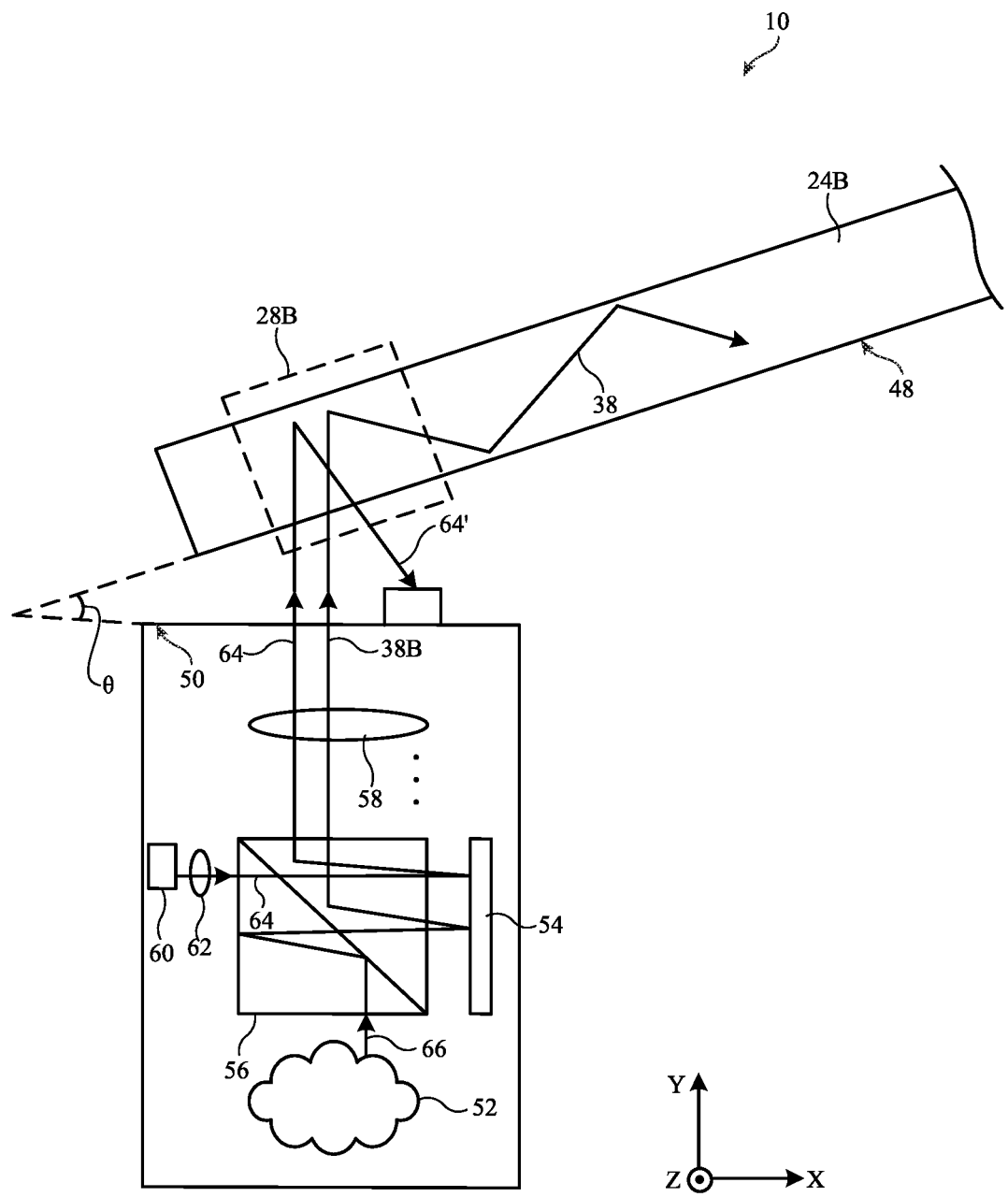
FIG. 5 is a top view of an illustrative display projector having an infrared emitter and an infrared optical sensor for detecting a waveguide angle in accordance with some embodiments.

FIG. 5 is a top view showing one example of how projector 22B may emit infrared light for measurement by optical sensor 40. As shown in FIG. 5, projector 22B may include illumination optics 52. Illumination optics 52 may include one or more light sources that emit illumination light 66 in one or more visible wavelength ranges (e.g., red, green, and blue illumination light).

Projector 22B may include a spatial light modulator such as reflective spatial light modulator 54. Reflective spatial light modulator 54 may include a reflective display panel such as a digital micromirror device (DMD) panel, a liquid crystal on silicon (LCOS) panel, a ferroelectric liquid crystal on silicon (fLCOS) panel, or other spatial light modulators. Optics 56 (e.g., one or more optical wedges or prisms, partial reflectors, polarizers, reflective polarizers, or other structures) may direct illumination light 66 to reflective spatial light modulator 54.

Reflective spatial light modulator 54 may be controlled using image data to selectively reflect illumination light 66 at different pixel positions (e.g., as determined by the image data) to produce image light 38B. In other words, reflective spatial light modulator 54 may modulate image data onto illumination light 66 to produce image light 38B or may modulate illumination light 66 using the image data to produce image light 38B. Optics 56 may redirect image light 38B towards input coupler 28B on waveguide 24B. Collimating optics 58 (e.g., one or more lens elements sometimes referred to as eyepiece optics) in projector 22B may help to direct and collimate image light 38B towards input coupler 28B.

Projector 22B may include one or more infrared emitters such as infrared emitter 60. Infrared emitter 60, optics 56, illumination optics 52, reflective spatial light modulator 54, and/or collimating optics 58 may be disposed in a housing for projector 22B if desired. Infrared emitter 60 may emit infrared light 64, which is directed towards reflective spatial light modulator 54 by lens 62 and optics 56. The infrared light referred to herein may include infrared (IR) and/or near infrared (NIR) wavelengths. Reflective display panel 54 may reflect infrared light 64. Optics 56 and collimating optics 58 may direct infrared light 64 towards waveguide 24B. A lateral surface of waveguide 24B and/or a zero-order mode of a diffractive grating in input coupler 28B may reflect a portion 64' of infrared light 64 towards optical sensor 40. Optical sensor 40 may generate optical sensor data (e.g., infrared optical sensor data) based on the portion 64' of infrared light 64, which is then used to detect waveguide angle θ. If desired, input coupler 28B may couple an additional portion of infrared light 64 into waveguide 24B (e.g., within the TIR range of the waveguide). This portion of infrared light 64 may propagate down waveguide 24B and may be coupled out of waveguide 24B (e.g., by output coupler 30B of FIG. 3) and directed towards the eye box. This portion of infrared light 64 may reflect off the user's eye at the eye box and may be detected by an infrared optical sensor in device 10 to detect and track the direction of the user's gaze over time (e.g., infrared light 64 may also be used to perform gaze tracking).

Figure 6:
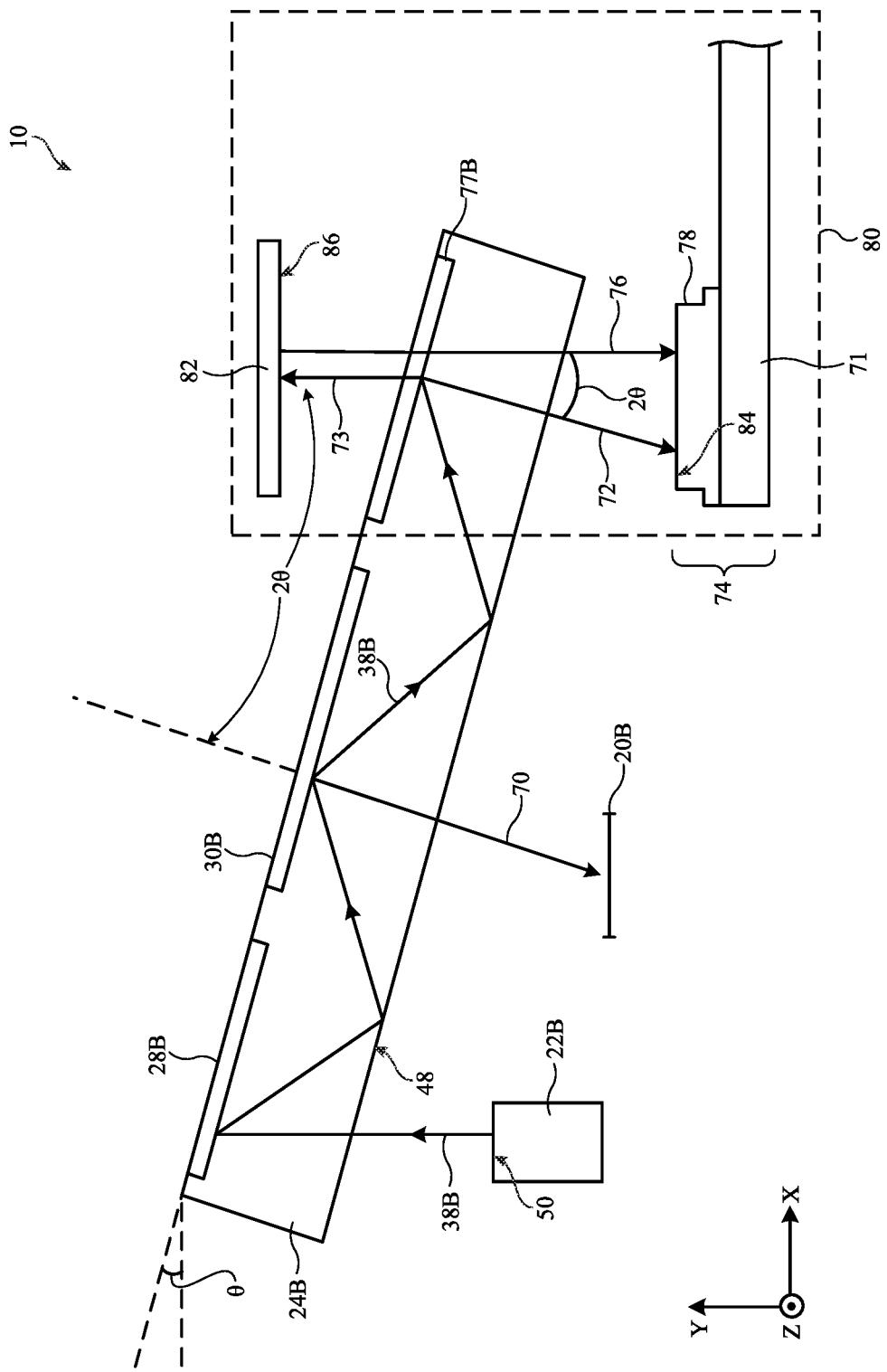
FIG. 6 is a top view of an illustrative display system having an optical bridge sensor and a mirror for detecting a waveguide angle in accordance with some embodiments.

If desired, an optical bridge sensor for device 10 may be used to detect waveguide angle θ. FIG. 6 is a top view showing one example of how an optical bridge sensor for device 10 may be used to detect waveguide angle θ. As shown in FIG. 6, projector 38B may emit image light 38B that is coupled into waveguide 24B by input coupler 28B. Waveguide 24B may be tilted or oriented at waveguide angle θ with respect to projector 22B. Waveguide 24B may propagate image light 38B along its length. Output coupler 30B may couple some of image light 38B out of waveguide 24B and towards eye box 20B (in the direction of arrow 70).

As shown in FIG. 6, an optical sensor such as optical bridge sensor 74 may be disposed in device 10 at an opposite end of waveguide 24B from projector 22B. For example, optical bridge sensor 74 may be disposed within nose bridge NB of main portion 18M of the housing (FIG. 2). Optical bridge sensor 74 may be optically coupled to waveguides 24B and 24A (FIG. 2) and may, if desired, be mounted to waveguides 24A and 24B (e.g., using a mounting bracket or frame). Waveguide 24B may include an additional output coupler at the end of waveguide 24B opposite projector 22B such as output coupler 77B (sometimes referred to herein as supplemental output coupler 77B, bridge output coupler 77B, or bridge sensor output coupler 77B). Output coupler 77B may couple some of the image light 38B propagating through waveguide 24B (e.g., a portion of image light 38B not coupled out of the waveguide by output coupler 30B) out of waveguide 24B and into optical bridge sensor 74 (in the direction of arrow 72). Similarly, waveguide 24A may include an additional output coupler that couples some of the image light propagating through waveguide 24A out of waveguide 24A and into optical bridge sensor 74.

Optical bridge sensor 74 may include one or more optical sensors 78 that gather (e.g., generate, capture, detect, measure, produce, etc.) optical sensor data (sometimes referred to herein as optical bridge sensor data) from the image light coupled out of waveguides 24A and/or 24B. Optical sensor (s) 78 may be mounted to a common package or substrate such as substrate 71 (e.g., a rigid or flexible printed circuit board). The optical sensor data gathered by optical bridge sensor 74 may be a real-time representation of the image data that is actually being provided to eye box 20B after propagating from the projector 22B and through waveguide 24B. The optical bridge sensor image data may therefore allow for real-time measurement of the image light provided to the eye box.

Optical sensor 78 may be used to detect (measure) waveguide angle θ based on the image light 38B emitted by projector 22B (similar to optical sensor 40 of FIGS. 4 and 5). Optical sensor 78 may include one or more visible light optical sensors or cameras having one or more optical sensor pixels arranged in corresponding array(s) of optical sensor pixels. One or more lenses or microlenses may be disposed overlapping the optical sensor(s). Optical sensor 78 may include a quad cell sensor as one example. If desired, optical sensor 78 may also be used to detect (measure) optical misalignment between the left and right sides of the display (e.g., between waveguides 24A and 24B).

Optical bridge sensor 74 may sometimes also be referred to as an optical misalignment detection sensor, an optical alignment sensor, or an optical misalignment detection module. If desired, optical bridge sensor 74 may be integrated within a sensor housing. The sensor housing may be formed from a part of main portion 18M of housing 18 within nose bridge NB (FIG. 1), may be a separate housing enclosed within nose bridge NB of main portion 18M, may be a frame or bracket that supports housing portion 18M, or may be omitted. Optical bridge sensor 74 may have a first end mounted or coupled to waveguide 24B and may have an opposing second end mounted or coupled to waveguide 24A (e.g., using optically clear adhesive or other mounting structures).

Output coupler 77B may be formed from an output coupling prism or waveguide facets, mirror(s) (e.g., louvered mirrors), or diffractive grating structures such as a surface relief grating or volume holograms. In the example of FIG. 6, input coupler 28B, output coupler 30B, and output coupler 77B are diffractive gratings in a layer of grating medium such as surface relief gratings (SRGs) in a layer of SRG medium. For example, output coupler 77B may include a first SRG in a layer of SRG medium on waveguide 24B, output coupler 30B may include a second SRG in the layer of SRG medium on waveguide 24B, and input coupler 28B may include a third SRG in the layer of SRG medium on waveguide 24B. This example is merely illustrative and, in general, input coupler 28B, output coupler 30B, and output coupler 77B may be formed from any desired optical coupler structures integrated into or onto waveguide 24B in any desired manner.

Optical sensor 78 may generate optical sensor data in response to the image light 38B coupled out of waveguide 24B by output coupler 77B in the direction of arrow 72. However, this optical sensor data on its own may not be sufficient to detect waveguide angle θ. A reflective structure such as mirror 82 may therefore be disposed overlapping optical sensor 78 at or on the side of waveguide 24B opposite to optical bridge sensor 74 (e.g., waveguide 24B may be interposed between mirror 82 and optical bridge sensor 74). Mirror 82 may have a lateral (reflective) surface 86. Output coupler 77B may have a reflective diffractive mode or order that reflects (via diffraction) a first portion of the incident image light 38B towards optical sensor 78 in the direction of arrow 72. Output coupler 77B may also have a transmissive diffractive mode or order that transmits (via diffraction) a second portion of the incident image light 38B towards mirror 82 in the direction of arrow 74. The reflective diffractive mode of output coupler 77B may be configured to couple image light 38B out of waveguide 24B at the same angle with which output coupler 30B couples image light 38B out of waveguide (e.g., arrows 70 and 72 may be parallel).

Mirror 82 reflects the second portion of image light 38B incident in the direction of arrow 73 in the direction of arrow 76. Arrow 76 may be oriented at a reflected angle with respect to arrow 73 (e.g., arrows 73 and 76 may be bisected by a reflective axis that is separated from arrow 73 and arrow 76 by equal angles). In situations where arrow 73 is oriented perpendicular to lateral surface 86 of mirror 82, arrow 76 is also oriented perpendicular to lateral surface 86 of mirror 82. Since output coupler 77B is not Bragg-matched to the direction of arrow 76, the second portion of the image light 38B reflected by mirror 82 is transmitted through output coupler 77B (without diffracting) and waveguide 24B and is received at optical sensor 78. Optical sensor 78 may generate optical sensor data based on the second portion of the image light 38B reflected by mirror 82 and received in the direction of arrow 76.

Mirror 82 may be mounted to optical bridge sensor 74 using a mounting bracket or frame, may be mounted to waveguide 24B using optically clear adhesive, and/or may be mounted to the housing for device 10. In general, mirror 82 may be rigidly mounted such that lateral (reflective) surface 86 of mirror 82 extends parallel to a lateral (sensing) surface 84 of optical sensor 78 (e.g., parallel to the lateral surface 50 of projector 22B and the X-axis of FIG. 6) and such that any change in the position/orientation of optical sensor 78 over time will also produce the same change in the position/orientation of mirror 82. In other words, mirror 82 and optical bridge sensor 74 may be mounted in device 10 in such a way as to form a corresponding fixed reference frame 80 for generating the optical sensor data.

By mounting mirror 82 and optical bridge sensor 74 within device 10 in this way, the transmissive diffractive mode of output coupler 77B may couple image light 38B out of waveguide 24B at an angle 2θ (two times waveguide angle θ) with respect to the inverse of the angle with which output coupler 30B couples image light 38B out of waveguide 24B (e.g., arrow 73 and arrow 70 may lie within respective lines that are oriented at angle 20 with respect to each other). The image light reflected by mirror 82 will therefore be oriented at angle 20 with respect to the image light reflected by the reflective diffractive mode of output coupler 77B (e.g., arrow 76 may be oriented or tilted at angle 20 with respect to arrow 72).

The optical sensor data generated by optical sensor 78 will therefore include first optical sensor data generated in response to the image light 38B reflected by output coupler 77B and incident in the direction of arrow 72 and second optical sensor data generated in response to the image light 38B reflected by mirror 82 and incident in the direction of arrow 76. The control circuitry may process the optical sensor data to detect (e.g., identify, measure, compute, generate, etc.) waveguide angle $\theta$. For example, the control circuitry may detect waveguide angle $\theta$ based on the lateral separation between the first optical sensor data generated from image light incident in the direction of arrow 72 and the second optical sensor data generated from image light incident in the direction of arrow 76 (e.g., the distance in pixel position between intensity peaks in a frame of optical sensor data generated by optical sensor 78), since this lateral separation is expected to be zero when waveguide angle $\theta$ is equal to zero. If desired, the control circuitry may detect waveguide angle $\theta$ by comparing the optical sensor data generated by optical sensor 78 to calibration image data that indicates what the optical sensor data is expected to be under different waveguide angles $\theta$ (e.g., as generated during manufacture or calibration of device 10).

Figure 7:
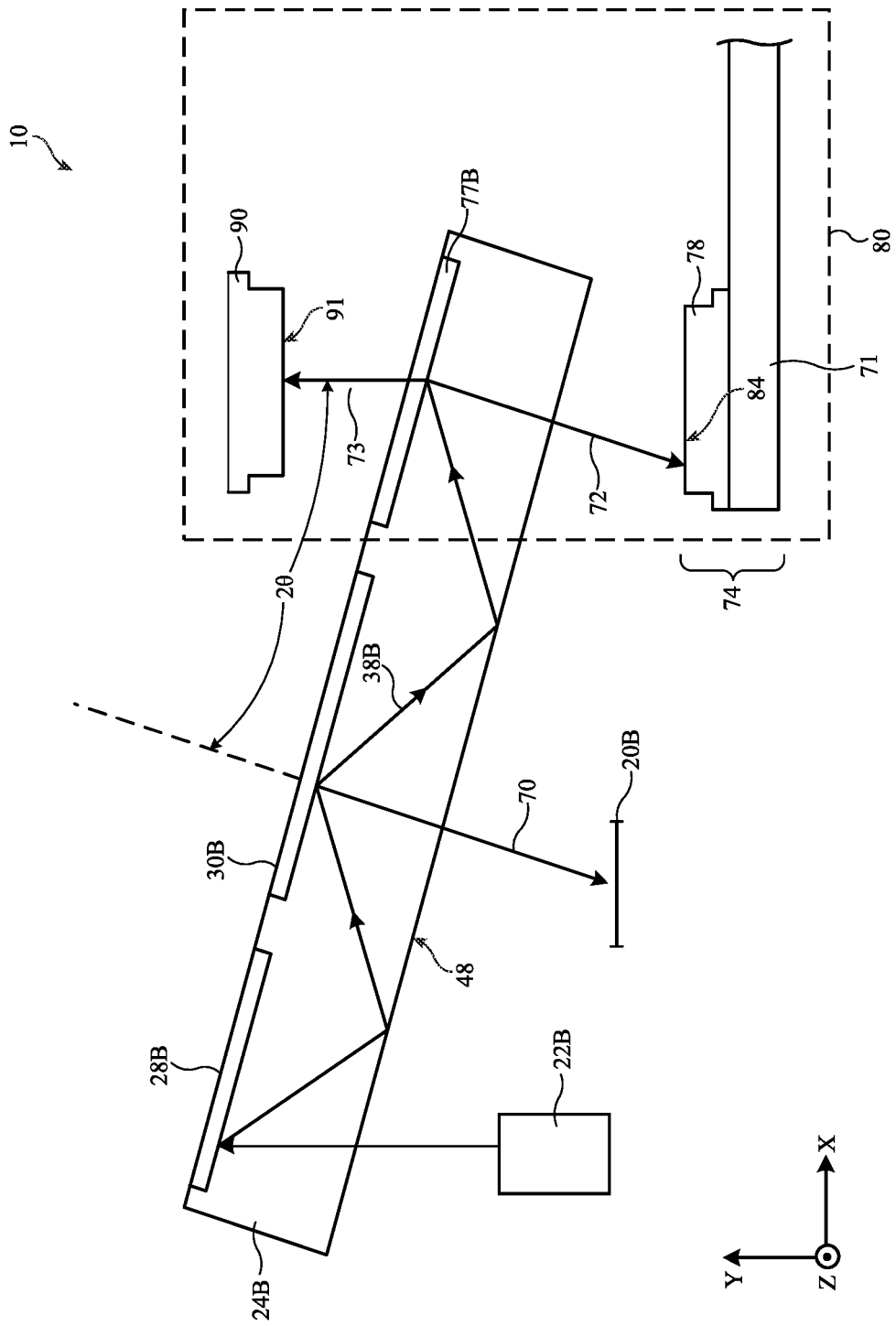
FIG. 7 is a top view of an illustrative display system having optical sensors at opposing sides of a waveguide for detecting a waveguide angle in accordance with some embodiments.

If desired, mirror 82 may be replaced with an additional optical sensor such as optical sensor 90 in FIG. 7. As shown in FIG. 7, optical sensor 90 may be rigidly mounted within device 10 with respect to optical bridge sensor 74 (e.g., forming parting of reference frame 80) at the location of mirror 82 of FIG. 6. Optical sensor 90 may have a lateral surface 91 (e.g., an image sensing surface) oriented parallel to lateral surface 84 of optical sensor 78. Rather than reflecting the image light coupled out of waveguide 24B by the transmissive diffractive mode of output coupler 77B, optical sensor 90 may generate optical sensor data in response to the image light coupled out of waveguide 24B by the transmissive diffractive mode of output coupler 77B (e.g., as incident upon optical sensor 90 in the direction of arrow 73). The control circuitry may then identify waveguide angle $\theta$ based on the optical sensor data gathered by optical sensor 90 (e.g., the position of the optical sensor data in the field of view of optical sensor 90) and the optical sensor data gathered by optical sensor 78 (e.g., the position of the optical sensor data in the field of view of optical sensor 90). The control circuitry may then mechanically adjust one or more components in device 10 and/or adjust the image data provided to projector 22B to mitigate the optical effects at eye box 20B of waveguide angle $\theta$ differing from a nominal or expected value (e.g., zero degrees).

The examples of FIGS. 6 and 7 are merely illustrative. If desired, optical sensor 78 and/or optical sensor 90 may be infrared optical sensors and output coupler 77B may couple infrared light emitted by projector 22B (e.g., infrared light 64 of FIG. 5) out of waveguide 24B and towards optical sensors 78 and/or 90. The control circuitry may then use optical sensor data generated by optical sensors 78 and/or 90 to detect waveguide angle $\theta$. Waveguide 24B may also include a cross-coupler if desired. The optical sensors and components of FIGS. 4-7 may be combined if desired (e.g., device 10 may include two or more of optical sensor 40, optical sensor 78, mirror 82, and optical sensor 90 for measuring waveguide angle and/or other alignments or distortions). Similar components and techniques may be used to detect the waveguide angle of waveguide 24A (FIG. 2).

Figure 8:
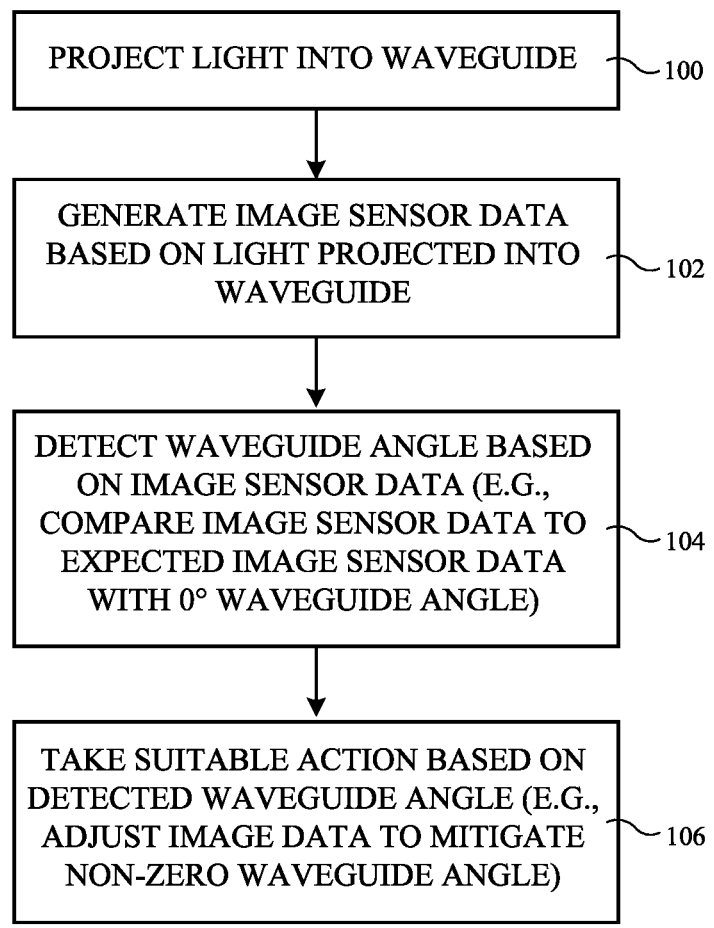
FIG. 8 is a flow chart of illustrative operations involved in using a system of the type shown in FIGS. 1-8 to detect and mitigate changes in waveguide angle in accordance with some embodiments.

FIG. 8 is a flow chart of illustrative operations involved in detecting and mitigating waveguide angle $\theta$ between waveguide 24B and projector 22B. Similar operations may also be used to detect changes in the waveguide angle between waveguide 24A and projector 22A (FIG. 2).

At operation 100, device 10 may project light into waveguide 24B via input coupler 28B. The light may include image light 38B and/or infrared light 64 (FIG. 5). Waveguide 24B may propagate the light via total internal reflection. Output coupler 30B may couple a first portion of the light out of waveguide 24B and towards eye box 20B. If desired, a second portion of the light may be reflected off one or more lateral surfaces of waveguide 24B and/or may be reflected by a zero-order mode of a diffractive grating in input coupler 28B towards optical sensor 40 on projector 22B (FIGS. 4 and 5). If desired, a third portion of the light may continue to propagate along waveguide 24B without being coupled out of waveguide 24B by output coupler 30B. In these examples, output coupler 77B (FIGS. 6 and 7) may couple a first portion of the third portion of the light out of the waveguide and towards optical sensor 78 in optical bridge sensor 74. If desired, output coupler 77B may also couple a second portion of the third portion of the light out of the waveguide and towards mirror 82 (FIG. 6) or optical sensor 90 (FIG. 7). In implementations where device 10 includes mirror 82, mirror 82 may reflect the second portion of the third portion of the light towards optical sensor 78 in optical bridge sensor 74.

At operation 102, device 10 may generate optical sensor data (e.g., image sensor data) based on the light projected by projector 22B. For example, optical sensor 40 (FIGS. 4 and 5) may generate optical sensor data in response to the second portion of the light (e.g., portion 64' of infrared light 64 of FIG. 5 or portion 38B' of image light 38 of FIG. 4). Additionally or alternatively, optical sensor 78 may generate optical sensor data in response to the first portion of the third portion of the light (e.g., as shown by arrow 72 of FIGS. 6 and 7). Additionally or alternatively, optical sensor 78 or optical sensor 90 may generate optical sensor data in response to the second portion of the third portion of the light (e.g., as shown by arrows 73 and 76 of FIG. 6 or arrow 73 of FIG. 7).

At operation 104, control circuitry in device 10 may detect (e.g., identify, measure, compute, calculate, generate, etc.) waveguide angle $\theta$ based on the gathered optical sensor data. The control circuitry may detect waveguide angle $\theta$ by comparing the gathered optical sensor data to calibrated or predetermined optical sensor data expected to be produced under one or more different (known) waveguide angles $\theta$, as one example.

At operation 106, the control circuitry may take suitable action based on the detected waveguide angle. For example, the control circuitry may perform one or more operations to mitigate the detected waveguide angle. For example, the control circuitry may control one or more actuators or other mechanical adjustment structures to adjust the position of waveguide 24B, the orientation of waveguide 24B, the position of projector 22B, or the strain applied to waveguide 24B in a manner that reverses or mitigates the distortions produced on the image light by the detected amount of waveguide deformation. As another example, the control circuitry may predistort, warp, color-compensate, or otherwise adjust (e.g., digitally transform, translate, rotate, etc.) the image data provided to projector 22B and used to produce image light 38B in a manner that mitigates the effects of the detected waveguide angle deviating from a nominal or expected waveguide angle such as a waveguide angle of zero degrees. Additionally or alternatively, the control circuitry may issue an alert to the user or to a server identifying that waveguide angle exceeds a threshold value, may instruct the user to have some or all of device 10 repaired or replaced, and/or may instruct the user to mechanically adjust one or more components of device 10 or the position of device 10 on their head to mitigate the optical effects of changes in the waveguide angle. If desired, the optical sensor data may also be used to perform mechanical or digital adjustments to align the left projector, waveguide, and/or eye box with the right projector, waveguide, and/or eye box and/or to perform gaze tracking operations.

The foregoing is merely illustrative and various modifications can be made to the described embodiments. The foregoing embodiments may be implemented individually or in any combination.

What is claimed is:

1. An electronic device comprising:
   a projector configured to emit image light;
   a waveguide;
   an input coupler configured to couple the image light into the waveguide;
   an output coupler configured to couple at least a portion of the image light out of the waveguide;
   an optical sensor configured to generate optical sensor data, wherein the optical sensor is mounted to the projector and faces the waveguide; and
   one or more processors configured to detect an angle between the projector and the waveguide based on the optical sensor data, wherein the waveguide has a first lateral surface and a second lateral surface opposite the first lateral surface, the waveguide is configured to propagate the image light via total internal reflection between the first and second lateral surfaces, the first lateral surface faces the projector, and the optical sensor is interposed between the first lateral surface and the projector.

2. The electronic device of claim 1, wherein the projector is configured to output infrared light that is different from the image light, the input coupler comprises a diffractive grating having a zero-order mode that configures the diffractive grating to reflect the infrared light from the projector back towards the optical sensor through the first lateral surface, and the optical sensor is configured to generate the optical sensor data based on the reflected infrared light.

3. The electronic device of claim 1, wherein the projector comprises an infrared emitter configured to emit the infrared light and wherein the infrared light and the image light are incident upon the input coupler through the first lateral surface of the waveguide.

4. The electronic device of claim 3, wherein the projector comprises:
   illumination optics configured to emit illumination light at visible wavelengths; and
   a reflective display panel configured generate the image light by modulating the illumination light using image data, the reflective display panel being further configured to reflect the infrared light.

5. The electronic device of claim 4, wherein the projector comprises optics configured to combine the infrared light with the image light.

6. The electronic device of claim 5, wherein the infrared light emitted by the infrared emitter is incident upon a first side of the optics and wherein the illumination light emitted by the illumination optics is incident upon a second side of the optics.

7. The electronic device of claim 6, wherein the image light generated by the reflective display panel is incident upon a third side of the optics.

8. The electronic device of claim 7, wherein the optics are configured to output the image light and the infrared light through a fourth side of the optics.

9. The electronic device of claim 8, wherein the projector further comprises a lens that transmits the infrared light and the image light to the input coupler.

10. The electronic device of claim 1, wherein the optical sensor is mounted to a surface of the projector that faces the first lateral surface of the waveguide.

11. The electronic device if claim 1, wherein the input coupler comprises a first surface relief grating in a layer of surface relief grating medium on the waveguide, and the output coupler comprises a second surface relief grating in the layer of surface relief grating medium.

12. The electronic device of claim 1, further comprising:
   an optical bridge sensor that is different than the optical sensor and that is configured to measure the image light.

13. The electronic device of claim 1, wherein the one or more processors is configured to adjust image data provided to the projector based on the detected angle between the projector and the waveguide.

14. A method of operating a display system comprising:
   with a projector, emitting light into a waveguide through a first lateral surface of the waveguide;
   with an input coupler, coupling the light into the waveguide;
   with the waveguide, propagating the light via total internal reflection between the first lateral surface and a second lateral surface of the waveguide that is opposite the first lateral surface;
   with a first output coupler on the waveguide, coupling a first portion of the light out of the waveguide;
   with a second output coupler on the waveguide, coupling a second portion of the light out of the waveguide and towards an optical sensor through the first lateral surface;
   with the second output coupler, coupling a third portion of the light out of the waveguide and towards a mirror through the second lateral surface, wherein the waveguide is interposed between the optical sensor and the mirror;
   with the mirror, reflecting the third portion of the light towards the optical sensor through the second and first lateral surfaces of the waveguide;
   with the optical sensor, generating optical sensor data based on the second portion of the light and the reflected third portion of the light; and
   with one or more processors, detecting an angle between the projector and the waveguide based on the optical sensor data generated by the optical sensor.

15. The method of claim 14, wherein the first and second portions of the light comprise image light having visible wavelengths.

16. The method of claim 14, wherein the first portion of the light comprises image light having visible wavelengths and wherein the second portion of the light comprises infrared light.

17. The method of claim 16, further comprising:
   with the one or more processors, performing gaze tracking based on the infrared light.

18. The method of claim 14, wherein the second output coupler has a transmissive diffractive mode that is configured to diffract the third portion of the light and has a reflective diffractive mode that is configured to diffract the second portion of the light.

19. The method of claim 14, wherein a surface of the mirror extends parallel to a sensing surface of the optical sensor.

20. The method of claim 14, further comprising:
with the one or more processors, adjusting image data provided to the projector based on the detected angle between the projector and the waveguide.

21. A display comprising:
a projector configured to generate light;
a waveguide configured to propagate the light via total internal reflection between a first lateral surface and a second lateral surface opposite the first lateral surface;
a first output coupler on the waveguide and configured to couple a first portion of the light out of the waveguide and towards an eye box;
an optical sensor;
a mirror, wherein the waveguide is interposed between the optical sensor and the mirror; and
a second output coupler overlapping the optical sensor and the mirror, wherein
the second output coupler is configured to couple a second portion of the light out of the waveguide and towards the mirror through the second lateral surface, and
the second output coupler is configured to couple a third portion of the light out of the waveguide and towards the optical sensor through the first lateral surface.

22. The display of claim 21, wherein the mirror is configured to reflect the third portion of the light towards the optical sensor through the second lateral surface and the first lateral surface, the mirror extends parallel to a sensing surface of the optical sensor, the optical sensor is configured to generate sensor data based on the second and third portions of the light, and the display further comprises:
processing circuitry configured to adjust the light based on the sensor data.

* * * * *